United States Patent
Lindner

(10) Patent No.: US 11,958,670 B2
(45) Date of Patent: Apr. 16, 2024

(54) CABLE TIE, FITTING SET AND METHOD FOR PRODUCING THE CABLE TIE

(71) Applicant: NEXANS, Courbevoie (FR)

(72) Inventor: Gerhard Lindner, Floss (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/946,970

(22) Filed: Sep. 16, 2022

(65) Prior Publication Data

US 2023/0099187 A1     Mar. 30, 2023

(30) Foreign Application Priority Data

Sep. 24, 2021   (EP) ..................................... 21306320

(51) Int. Cl.
*B65D 63/10*     (2006.01)

(52) U.S. Cl.
CPC .... *B65D 63/1063* (2013.01); *B65D 2563/103* (2013.01)

(58) Field of Classification Search
CPC ........... B65D 63/1063; B65D 2563/103; F16L 3/2334; F16L 3/04; H02G 3/32
USPC ...................................................... 24/16 PB
See application file for complete search history.

(56) References Cited

U.S. PATENT DOCUMENTS

| | | | | |
|---|---|---|---|---|
| 3,930,287 A * | 1/1976 | Grise | ................... | A44C 5/0053 24/16 PB |
| 4,235,404 A * | 11/1980 | Kraus | ..................... | F16L 3/233 248/74.3 |
| 5,395,343 A * | 3/1995 | Iscovich | ................ | A61M 25/02 604/179 |
| 5,970,585 A * | 10/1999 | Scholey | ................. | A44B 11/28 2/452 |
| 6,138,327 A * | 10/2000 | Powell | .............. | B29C 45/14467 24/298 |
| 10,337,541 B2 | 7/2019 | Courbis | | |
| 11,326,719 B2 * | 5/2022 | Courbis | .................. | F16L 3/137 |
| 2003/0088949 A1 * | 5/2003 | Barriuso | ............... | F16L 3/2334 24/16 PB |
| 2007/0067965 A1 * | 3/2007 | Sugiyama | .............. | B65D 63/14 24/16 PB |
| 2009/0265894 A1 * | 10/2009 | Link | ..................... | F16L 33/035 24/16 PB |
| 2016/0001945 A1 * | 1/2016 | Foreman | ............... | F16L 3/2334 24/16 PB |
| 2020/0224797 A1 | 7/2020 | Courbis | | |
| 2022/0255301 A1 * | 8/2022 | Vaccaro | ................... | H02G 3/32 |

OTHER PUBLICATIONS

Search Report dated Mar. 7, 2022.

* cited by examiner

*Primary Examiner* — Robert Sandy
*Assistant Examiner* — Rowland Do
(74) *Attorney, Agent, or Firm* — Sofer & Haroun, LLP

(57) ABSTRACT

A cable tie has a band and having a tensioning device which is integrated in the band and which divides the band into a first and a second region, each of which regions has a toothed portion. A cable channel, or a component, to which an object, such as for example a cable harness, is to be fastened can remain in the fitting position because both ends of the cable tie can be plugged into cable locks from one side. No tools are required for the fitting of the cable tie.

10 Claims, 4 Drawing Sheets

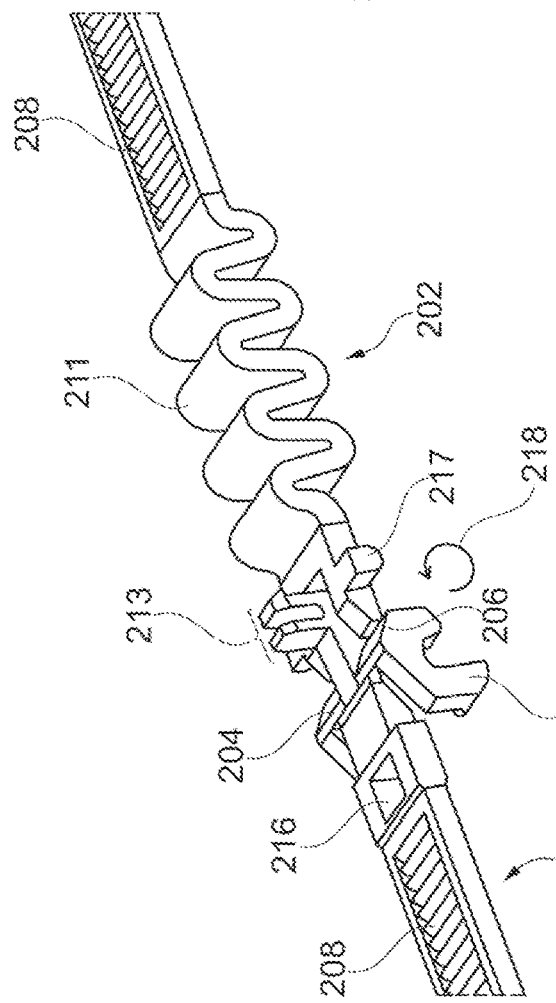
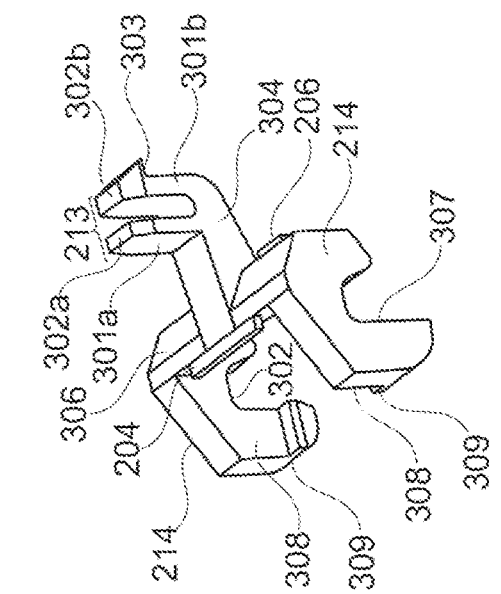
Fig. 3A
Fig. 3B
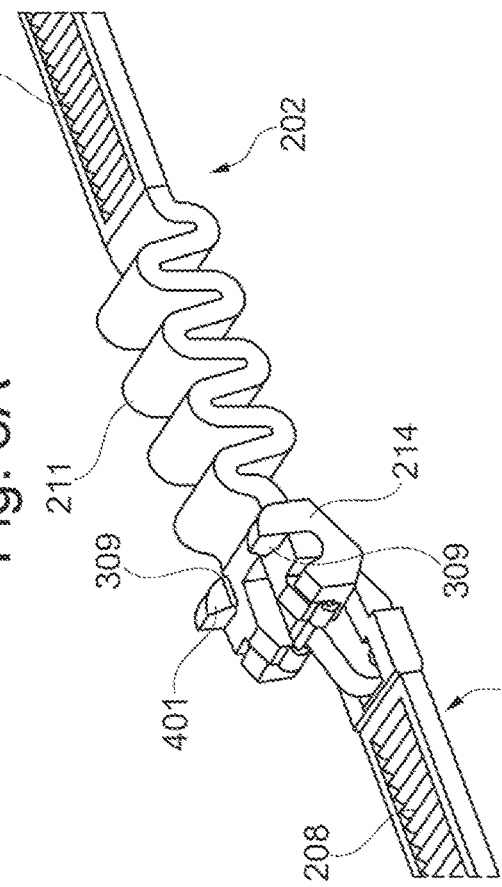
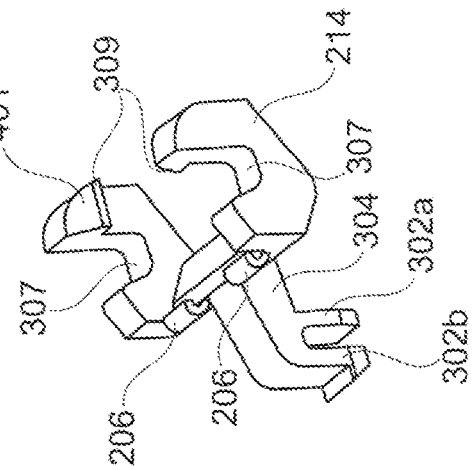
Fig. 4A
Fig. 4B

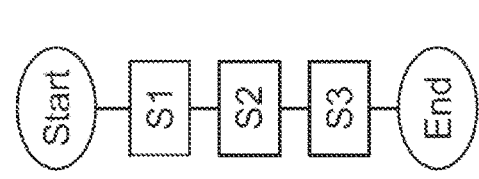
Fig. 7
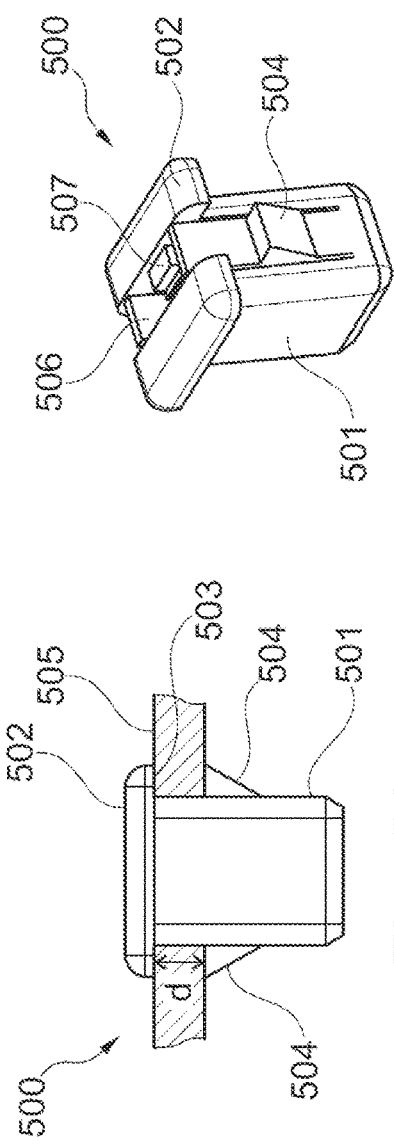
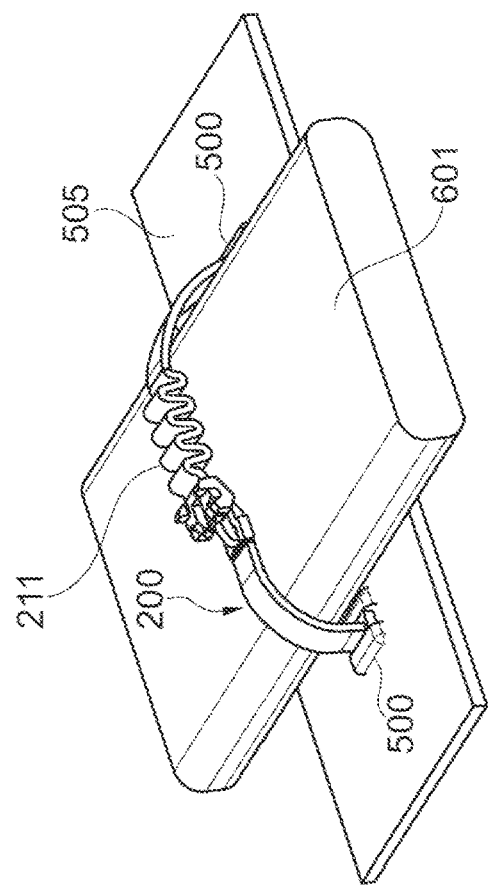
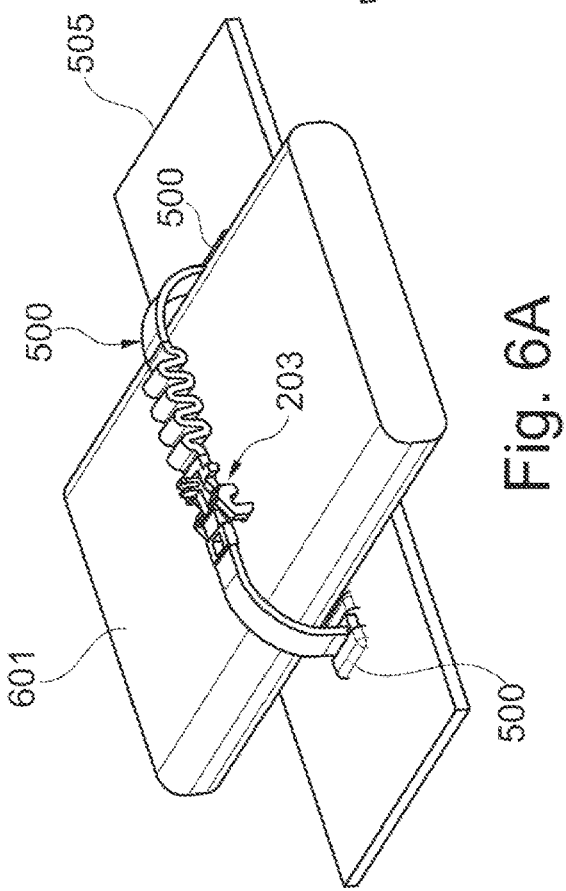

CABLE TIE, FITTING SET AND METHOD FOR PRODUCING THE CABLE TIE

RELATED APPLICATION

This application claims the benefit of priority from European Patent Application No. 21 306 320, filed on Sep. 24, 2021, the entirety of which is incorporated by reference.

FIELD

The invention relates to an easy-to-fit cable tie, and to a fitting set having such a cable tie. The invention moreover relates to a method for producing the cable tie.

BACKGROUND

Cable ties are used in the production of numerous products. A typical application is bundling of individual lines to form a cable harness and/or fastening of lines and cables to another component in a product. This type of use gives cable ties their name, but cable ties are frequently also used for fastening hoses or the like. The success of cable ties in production is due to their simple but effective functioning: In most cases, they consist of a flexible plastic strip, at the end of which a head or lock with an opening is situated. The strip is provided with a toothing, and the head is provided with an inclined latching tongue which engages into the toothing. During the plugging-in of the plastic strip, the inclined latching tongue is deflected transversely to its longitudinal extent and in the process latches into depressions of the toothing one after the other. It is not however possible for the strip to be subsequently pulled out of the head because, in the process, a force is introduced into the latching tongue along its longitudinal extent. The latching tongue is designed in such a way that said force is introduced into the head without the latching tongue being deformed. As a result, this leads to the pulling of the strip out of the head being blocked.

It necessarily follows from the construction and the function of known cable ties that, for fastening an object to another component, both the object and the other component have to be wound around. In some installation situations, this can be difficult or even completely impossible. Furthermore, the tension at which the cable tie holds the object fixedly on the other component depends primarily on the force applied by a worker to pull the strip into the head of the cable tie. It goes without saying that there are individual differences here, which can have a disadvantageous effect on consistent manufacturing quality. This can be counteracted only through the use of a special tool.

OBJECTS AND SUMMARY

Taking this as a starting point, the object of the present invention is to provide a cable tie for overcoming or at least reducing one or more of the problems stated in the introduction.

To achieve said object, the invention proposes, according to a first aspect, a cable tie having a band and having a tensioning device which is integrated in the band and which divides the band into a first and a second region, each of which regions has a toothed portion. The first and second region of the band will also be referred to below as first and second band.

The cable tie according to the invention has the advantage that the cable tie does not need to be pre-fitted even for looping. A cable channel, or a component, to which an object, such as for example a cable harness, is to be fastened can remain in the fitting position because both ends of the cable tie can be plugged into cable locks from one side. No tools are required for the fitting of the cable tie.

The free ends of the cable tie can be plugged into cable-tensioning locks, whereby an object can be fastened to a component without the cable tie having to be firstly placed in a loop around the component and the object. In fact, there are installation situations or production-related processes in which it is very difficult to form such a loop at all. Such difficult installation situations owing to confined spaces are encountered frequently for example in motor-vehicle construction. By way of the tensioning device, the cable band is tensioned and the object is fixed to the component with a predetermined force.

In an advantageous embodiment of the cable tie, the tensioning device is designed to be pivotable and comprises a latching head and two tensioning hooks. The latching head fixes the once-realized tensioning of the tensioning device in the tensioning position, so that the tensioning device can no longer be released of its own accord.

In a preferred refinement, the tensioning device is connected to the two regions of the band by means of film hinges. For the fitting, the cable tie is provided as a unitary component, which offers production-related advantages, for example because only a single part has to be stocked. Furthermore, it is easier for a production worker to handle a single part than multiple parts. The hinge function of the film hinges additionally results in a defined movement direction of the individual parts being predetermined.

In an advantageous embodiment, the first region has a latching opening for receiving the latching head, and the second region has projecting tensioning pegs which fit into in each case one receiving part of the two tensioning hooks.

Advantageously, the first or the second region of the band has an elastic portion which can be extended in a longitudinal direction of the band.

The tension at which the object is held fixedly on the component is defined substantially by the elastic portion, so that deviations in the depth of the plugging-in of the ends of the cable tie into the cable locks are compensated by an extension to a greater or lesser extent of the elastic portion. The extension to a greater or lesser extent of the elastic portion has no or no significant effect on the tension, so that consistent quality of the production process is ensured.

In an advantageous refinement, the latching head has two resilient tabs, one of which is provided with a latching hook. The two resilient tabs make provision for the latching hook to be elastically deformable and consequently to be introducible into a corresponding opening in the first band and to latch there.

The tensioning hooks may be provided on the side facing towards the tensioning pegs with a latching projection. In the tensioning position of the tensioning device, the latching projections engage behind the second band and make provision for the tensioning device to be latched in place, and fixed in the tensioning position, on the second band too. The fixing of the tensioning device in the tensioning position is consequently more stable than if only the latching head were to make provision for the fixing. This form-fitting connection of the individual components renders the function of the film hinges no longer necessary, which is advantageous in the event of damage to the film hinges, for example due to ageing or hardening.

In an expedient refinement, run-on bevels are formed on the latching projections. The run-on bevels make provision for the latching hooks to be pushed apart shortly before latching into place on the second band, so as to facilitate the latching.

The cable tie is a simple injection-moulded part, only simple tools being required for the production thereof.

According to a second aspect, the invention proposes a fastening set for fastening objects to a component, comprising two cable-band locks and a cable tie according to the first aspect of the invention. The fastening set provides all the components that are necessary for fastening an object to a structural component for example in a vehicle or in another product. With the fastening set, all the advantages that have been discussed in connection with the cable tie according to the invention are realized.

According to a third aspect, the invention proposes a method for fitting a cable tie according to the first aspect of the invention in order to fasten an object to a component. The method comprises:

plugging and latching of cable-band locks into openings in the component;
introduction of the ends of the cable tie into in each case one of the cable-band locks; and
tensioning of the tensioning device.

Advantageously, the ends of the cable tie are introduced until the cable tie bears without play against the object. In this way, it is achieved that, by way of the tensioning device, a sufficient tension for fastening the object on the component is obtained.

In practice, it has proven to be expedient if the tensioning of the tensioning device is realized by way of pivoting of the tensioning device.

BRIEF DESCRIPTION OF THE DRAWINGS

The invention will be discussed in more detail below by way of example on the basis of an embodiment with reference to the accompanying figures. All the figures are purely schematic and not to scale. In the figures:

FIG. 3A shows an enlarged detail of a cable tie according to the invention in the non-tensioned state;
FIG. 3B shows an open tensioning device of the cable tie from FIG. 3A;
FIG. 4A shows an enlarged detail of a cable tie according to the invention in the tensioned state;
FIG. 4B shows a closed tensioning device of the cable tie from FIG. 4A;
FIGS. 5A, 5B show views of a cable-tie lock;
FIG. 6A shows a fitting situation with an open cable tie;
FIG. 6B shows a fitting situation with a closed cable tie;
and
FIG. 7 shows a schematic flow diagram for a method for fastening an object by way of a cable tie according to the invention.

Identical or similar elements are provided with the same or similar reference signs in the figures.

DETAILED DESCRIPTION

Figure 1A:
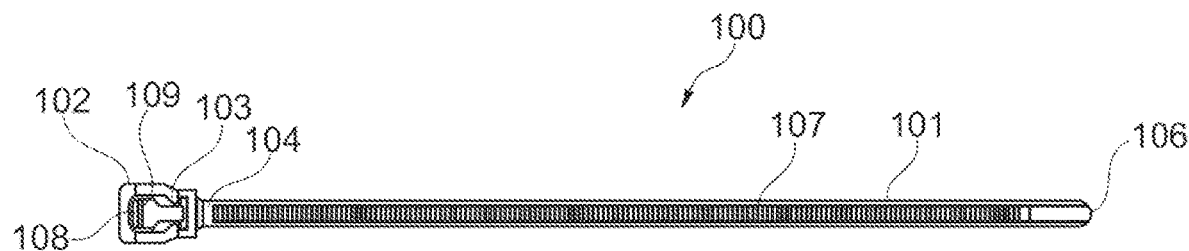
FIGS. 1A, 1B show a cable tie according to the prior art.

FIG. 1A shows a cable tie as is known from the prior art. The cable tie 100 has an elongate, flat band 101 and a head 102. A window 103 is formed in the head 102 and provides a passage through the head 102. The elongate band 101 has a first end 104 and an oppositely situated second end 106. The first end 104 is connected to the head 102. The band 101 is provided with a toothing 107 on a main surface. The second end 106 of the band 101 can be guided through the window 103. In the process, the toothing 107 comes into engagement with a free end 108 of a latching tongue 109. The latching tongue 109 interacts with the toothing 107 in such a way that the second end 106 of the band 101 can be plugged into the head 102 but can no longer be pulled out, as has been described in the introduction. In this way, the cable tie 100 can be placed like a loop around a component and an object to be fastened thereto or can unify multiple electrical lines and/or fluid lines (none of which are illustrated) to form a bundle. For this purpose, it is necessary for the cable tie 100 to be guided around the objects to be unified, which can present difficulties in some installation situations.

Figure 1B:
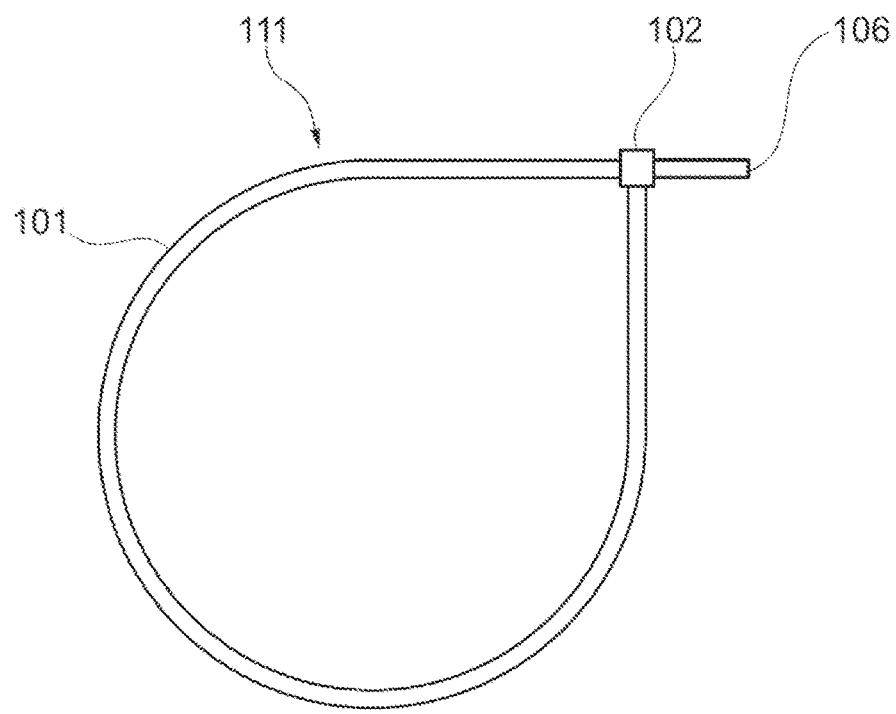

FIG. 1B illustrates a loop which the cable tie 100 forms when the second end 106 has been plugged into the head 102.

Figure 2:
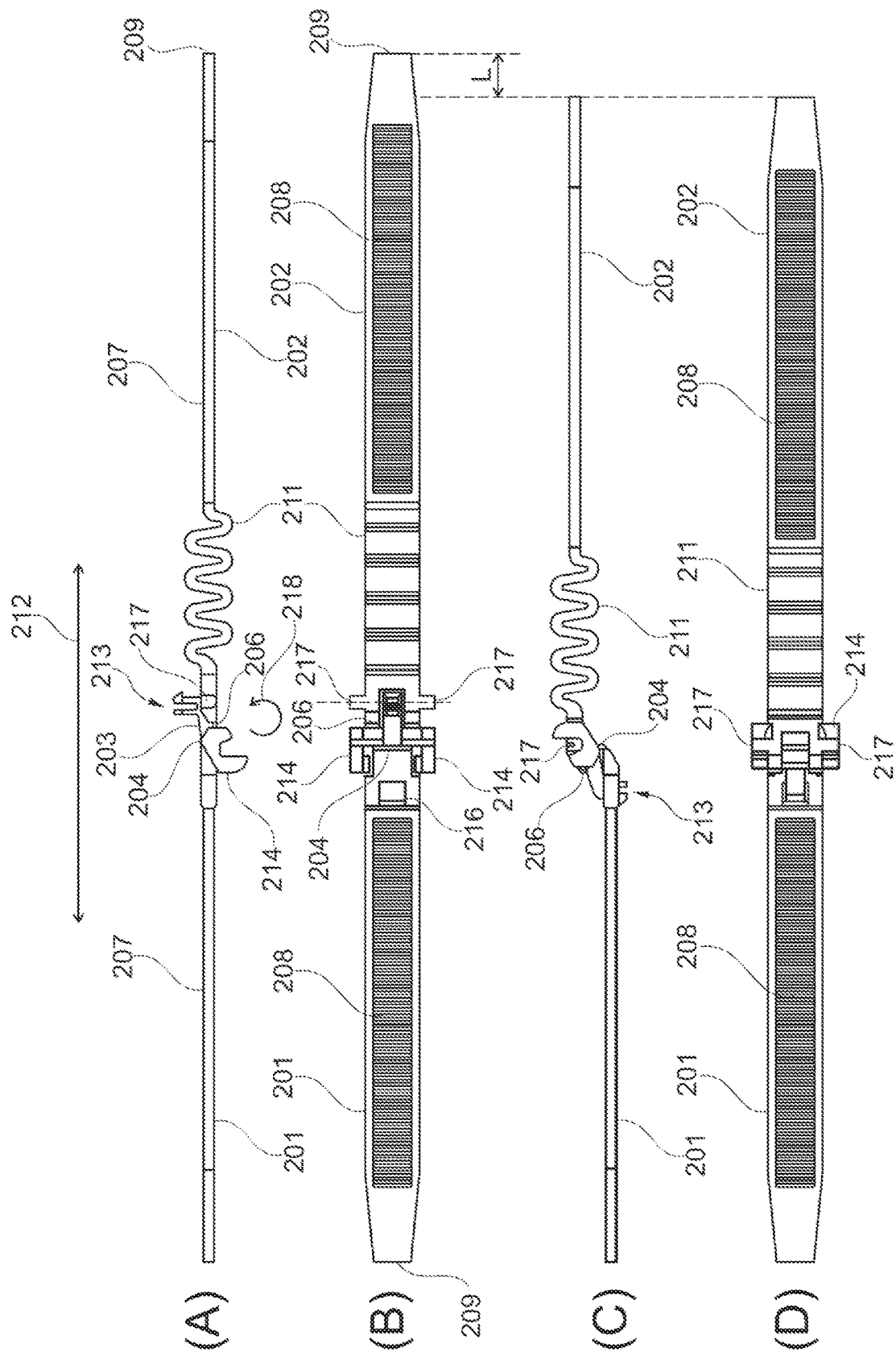
FIGS. 2A-2D show views of a cable tie according to the invention from the side and from above.

FIGS. 2A and 2B show a cable tie 200 according to the invention in a view from the side and in a plan view from above. The cable tie 200 comprises two cable bands 201, 202, which are connected to one another by means of a tensioning device 203. The cable bands will be called just "band" below, for short. The first band 201 is connected to the tensioning device 203 by means of a film hinge 204, and the second band 202 is connected to the tensioning device 203 by means of a film hinge 206. The first and second band 201, 202 have also been referred to as first and second region of a unitary cable band in the introduction. The bands 201, 202 each have a toothing 208 on a main surface 207. The ends 209 of the bands 201, 202 are tapered and, in this way, facilitate plugging into a cable-band lock 500 (FIG. 5A). The second band 202 furthermore has an undulating portion 211, which is elastically extensible in a longitudinal direction 212 of the cable tie 200. The cable tie 200 is illustrated in a non-tensioned state in FIGS. 2A and 2B.

The tensioning device 203 has a latching head 213 and two tensioning hooks 214. In a tensioned state of the cable tie 200, the latching head 213 interacts with a latching opening 216 in the first band 201 and the tensioning hooks 214 interact with tensioning pegs 217 arranged on the second band 202. For tensioning the cable tie, the tensioning device 203 is pivoted anticlockwise, as is indicated by arrow 218 in FIG. 2A.

FIGS. 2C and 2D illustrate the cable tie 200 in a tensioned state, with closed tensioning device 203. In the tensioned state, the cable tie 200 is shortened by a length L in comparison with the non-tensioned state shown in FIGS. 2A and 2B. In the installed state of the cable tie 200, when the bands 201, 202 have each been locked in a cable lock, the shortening of the cable tie 200 by the length L is compensated by a corresponding extension of the elastic portion 211.

FIG. 3A shows a perspective and enlarged view of a detail from FIG. 2A, with open tensioning device 203. FIG. 3B shows the open tensioning device 203 as an individual component. The latching head 213 is constructed from two resilient tabs 301a, 301b, whose free ends 302a, 302b are bevelled in order for the latching head 213 to find its way into the opening 216 more easily (FIG. 2C). On the resilient tab 301b, there is formed a latching projection 303 which, with the tensioning device 203 closed, that is to say when the latching head 213 is seated in the opening 216 (FIG. 2C), engages behind a bottom side of the first band 201 such that the latching head 213 can no longer be readily released from the opening 216. The latching head 213 is arranged on one end of a web 304, which, at its other end, supports a crossmember 306, on the ends of which crossmember the two latching hooks 214 are arranged. The tensioning hooks 214 each have a receiving part 307, the receiving parts being dimensioned such that the tensioning pegs 217 fit therein. On the inner sides 308 of the tensioning hooks 214, there are formed projections 309, the function of which will be described below with reference to FIGS. 4A and 4B. In order for the projections 309 not to get caught on the first band 201, an end region of the first band is formed to be relatively narrow. Finally in FIGS. 3A and 3B, it is possible to see parts of the film hinges 204, 206 around which the tensioning device 203 can be pivoted for the purpose of tensioning. The pivoting movement for tensioning of the tensioning device 203 is realized anticlockwise, as is indicated by the arrow 218 (FIG. 2A).

FIG. 4A illustrates the tensioning device 203 in a tensioning state and the cable tie 200 in a tensioned state, which is achieved by way of the anticlockwise pivoting of the tensioning device 203. At the end of the pivoting movement of the tensioning device 203, the latching head 213 is seated in the opening 216 and the tensioning pegs 217 are received in the receiving parts 307 of the tensioning hooks 214. As can be seen in FIG. 4A, with the tensioning device 203 closed, the projections 309 engage behind a bottom side of the cable band 202, whereby the tensioning device 203 latches in place on the second cable band 202. In order to facilitate the latching-in-place of the tensioning device 203, the projections 309 are each provided with a run-on bevel 401, the run-on bevels making provision for the tensioning hooks 214 to in each case be forced outwards from the narrow sides of the cable band 202 and then snap back when the projections 309 have passed the cable band 202.

In order to fasten an object to a component by way of the cable tie 200, the free ends 209 of the cable tie 200 are fixed to the component by way of cable-band locks, as will be explained below with reference to FIGS. 6A and 6B.

FIGS. 5A, 5B show a cable-band lock 500 in a view from the side and in a perspective view. The cable-band lock 500 has a plug-in peg 501 with a rectangular cross section that supports at an upper end a bearing plate 502. The bearing plate 502 projects beyond the periphery of the plug-in peg 501 on all sides, so that a bearing flange 503 is formed. Latching hooks 504 are formed on the plug-in peg at a distance d from the bearing plate 502. The distance d corresponds approximately to a wall thickness of a component 505 into which the cable-band lock 500 is to be fitted. A channel 506 in which a cable band 200 can be plugged leads through the plug-in peg 501 and the bearing plate 502. In the channel 506, there is arranged a latching tongue 507, which comes into engagement with the toothing 208 on the cable band 200 in such a way that the cable band can be plugged into the cable-band lock 500 but can no longer be pulled out.

In other exemplary embodiments of the cable-band lock 500, the cross section of the plug-in peg 501 is and or has fewer or more than four corners. Furthermore, in other exemplary embodiments of the cable-band lock, more or fewer than two latching hooks 504 are provided. FIGS. 6A and 6B show a specific installation situation, wherein, in FIG. 6A, the cable tie 200 is not tensioned, while, in the illustration in FIG. 6B, it is tensioned. FIGS. 6A, 6B illustrate how a cable harness 601 is fastened on the component 505 by way of a cable tie 200. In the component 505, two cable-band locks have been fitted in openings in the component 505 provided for this purpose.

The cable-band lock may also be an integrated constituent part of a cable channel, a fitting process for said lock consequently being able to be saved.

The method for fastening the cable harness 601 to the component 505 is illustrated in FIG. 7 as a flow diagram. In a first step S1, cable-band locks 500 are plugged and latched into matching openings in the component 505. In a next step S2, the ends of the cable tie 200 are introduced into in each case one of the cable-band locks 500 until the cable tie 200 bears without play against the cable harness 601. Finally, in a step S3, tensioning of the tensioning device 203 on the cable tie 200 is realized by way of pivoting.

In this way, the cable harness 601 is fastened to the component 505 by way of the cable tie 200 without it being necessary for this purpose for the cable tie to be guided in a loop both around the cable harness 601 and around the component 505. This constitutes a considerable advantage in installation situations where little space is available to workers. Furthermore, the elastic portion 211 makes provision for the cable harness to at all times be fastened with a uniform tension to the component, because the tensile force prevailing in the cable tie 200 is substantially constant as a function of the extension of the selected portion 211. Therefore, for uniform manufacturing quality, it is not absolutely necessary for the workers to introduce the cable tie 200 into the cable-band locks 500 at all times with the same pretension.

The cable ties are manufactured in an injection-moulding process. For this purpose, it is generally the case that granular raw material is heated to a predefined temperature and liquefied. Subsequently, the melted material is pressed at high pressure into an injection mould.

In the claims, the words "have" and "comprise" do not exclude other elements or steps and the indefinite article "a"/"an" does not exclude a plurality.

| List of reference signs | |
| --- | --- |
| 100 | Cable tie |
| 101 | Band |
| 102 | Head |
| 104 | First end |
| 106 | Second end |
| 107 | Toothing |
| 108 | Free end of a latching tongue |
| 109 | Latching tongue |
| 111 | Loop |
| 200 | Cable tie |
| 201, 202 | Bands |
| 203 | Tensioning device |
| 204, 206 | Film hinges |
| 207 | Main surface |
| 208 | Toothing |
| 209 | Ends |
| 211 | Undulating portion |
| 212 | Longitudinal direction |
| 213 | Latching head |
| 214 | Tensioning hook |
| 216 | Latching opening |
| 217 | Tensioning peg |
| 218 | Arrow |
| 301a, 301b | Resilient tab |
| 302a, 302b | Free ends |
| 303 | Latching projection |
| 304 | Web |
| 306 | Crossmember |
| 307 | Receiving part |
| 308 | Inner side |
| 309 | Projections |
| 401 | Run-on bevel |
| 500 | Cable-band lock |
| 501 | Plug-in peg |

-continued

| List of reference signs | |
|---|---|
| 502 | Bearing plate |
| 503 | Bearing flange |
| 504 | Latching hook |
| 505 | Component |
| 506 | Channel |
| 507 | Latching tongue |
| 601 | Cable harness |

The invention claimed is:

1. A cable tie comprising: a first and second cable band, which are permanently connected to one another by means of a tensioning device which is integrated between the first and second cable, wherein each cable band has a toothed portion at an end opposite to the tensioning device, wherein the tensioning device is designed to be pivotable and comprises a latching head and two tensioning hooks, and wherein one of the first and the second cable band has an elastic portion which can be extended in a longitudinal direction of the cable band.

2. The cable tie according to claim 1, wherein the tensioning device is connected to the first and second cable bands by means of film hinges.

3. The cable tie according to claim 1, wherein the first cable band has a latching opening for receiving the latching head, and the second cable band has projecting tensioning pegs which fit into in each case one receiving part of the two tensioning hooks.

4. The cable tie according to claim 1, wherein the latching head has two resilient tabs, one of which is provided with a latching projection.

5. The cable tie according to claim 1, wherein the tensioning hooks are provided on the side facing towards the tensioning pegs with a latching projection.

6. The cable tie according to claim 5, wherein run-on bevels are formed on the latching projections.

7. A fastening set for fastening objects to a component, comprising two cable-band locks and a cable tie according to claim 1.

8. A method for fitting a cable tie according to claim 1, in order to fasten an object to a component, wherein the method comprises the steps of:
    plugging and latching of cable-band locks into openings in the component;
    introduction of the toothed portions of the first and second cable band into the cable-band locks; and
    tensioning of the tensioning device.

9. The method according to claim 8, wherein the ends of the first and second cable bands are introduced until the cable tie bears without play against the object.

10. The method according to claim 8, wherein the tensioning of the tensioning device is realized by way of pivoting of the tensioning device.

* * * * *